United States Patent
Trautenberg

(10) Patent No.: US 7,924,221 B2
(45) Date of Patent: Apr. 12, 2011

(54) METHOD AND APPARATUS FOR MONITORING THE INTEGRITY OF SATELLITE NAVIGATION SIGNALS

(75) Inventor: Hans L. Trautenberg, Ottobrunn (DE)

(73) Assignee: Astrium GmbH, Munich (DE)

( * ) Notice: Subject to any disclaimer, the term of this patent is extended or adjusted under 35 U.S.C. 154(b) by 202 days.

(21) Appl. No.: 12/252,944

(22) Filed: Oct. 16, 2008

(65) Prior Publication Data

US 2009/0128409 A1    May 21, 2009

(30) Foreign Application Priority Data

Oct. 17, 2007   (DE) .......................... 10 2007 050 034

(51) Int. Cl.
  *G01S 19/08* (2010.01)
  *G01S 5/04* (2010.01)
(52) U.S. Cl. ................................. 342/357.45; 342/442
(58) Field of Classification Search ............. 342/357.45, 342/442
  See application file for complete search history.

(56) References Cited

U.S. PATENT DOCUMENTS

2005/0015680 A1 *  1/2005  Rubin et al. .................... 714/47
2005/0246093 A1 * 11/2005  Olague et al. ................. 701/207

OTHER PUBLICATIONS

Paolo D'Angelo et al., "GNSS Multi-System Integrity Algorithm Definition and Evaluation", XP-002505281, ION GNSS 20$^{th}$ International Technical Meeting of the Satellite Division, Sep. 25-28, 2007, pp. 3057-3063.
Cristina Pecchioni et al., "Combined Galileo and EGNOS Integrity Signal: a multisystem integrity algorithm", XP-002505280, GNSS, 2007 pp. 1-11.
Pieter Bastiaan Ober et al., "SBAS Integrity Verification", XP-002397832, ION GPS 2001, Sep. 11-14, 2001, pp. 1805-1830.
Theodor Zink et al., "Analyses of Integrity Monitoring Techniques for a Global Navigation Satellite System (GNSS-2)", XP-002343913, IAIN World Congress in association with the U.S. ION Annual Meeting, Jun. 26-28, 2000, pp. 117-127.
European Search Report dated Feb. 26, 2009 with partial English translation (Eight (8) pages.).
Stefan Vieweg, "Integrity Monitoring and Failure Identification within an Integrated Satellite-/Inertial Navigation System", Institute of Flight Guidance and Control, 1994, pp. 755-761.

* cited by examiner

*Primary Examiner* — Thomas H Tarcza
*Assistant Examiner* — Harry Liu
(74) *Attorney, Agent, or Firm* — Crowell & Moring LLP

(57) ABSTRACT

A method for monitoring the integrity of satellite navigation system includes a first detection of integrity problems, in which the same entity of a navigation signal from a particular satellite is received at different sites, and evaluated to estimate the error of the entity and the error made during the error estimation process. In a second detection, navigation signals received from a specific satellite are measured and evaluated to estimate the error of the entity and the error in the error estimation process. Finally, in a third detection, several navigation signals from different satellites are measured, and evaluated to estimate the error of the entity and the error made in the error estimation process. Integrity problems which are detectable in the first and second detections are taken into account only if it is probable that they occur during the third detection, and have not been discovered during the first and second detection.

17 Claims, 2 Drawing Sheets

METHOD AND APPARATUS FOR MONITORING THE INTEGRITY OF SATELLITE NAVIGATION SIGNALS

CROSS-REFERENCE TO RELATED APPLICATIONS

This application is related to U.S. application Ser. No. 12/256,281, filed Oct. 22, 2008.

BACKGROUND AND SUMMARY OF THE INVENTION

This application claims the priority of German patent document 10 2007 050 034.5-35, filed Oct. 17, 2007, the disclosure of which is expressly incorporated by reference herein.

The invention relates to a method and apparatus for monitoring the integrity of satellite navigation signals.

Global Navigation Satellite Systems (GNSS) are used for position indication and navigation on the ground, on water and in the air. GNSS Systems, as, for example, the European Navigation Satellite System currently being constructed (also referred to herein as the Galileo System or simply "Galileo") include a plurality of satellites, an earth-fixed receiving device system connected with a central computing station, and utilization systems which evaluate and use the satellite signals transmitted by radio by the satellites particularly for navigation.

In a GNSS, a precise detection of a user's position requires local as well as global integrity. "Integrity" in this sense means in particular that, on the one hand, the GNSS is capable of warning a user within a certain time period when parts of the GNSS should not be used for navigation (for example, in the event of a failure of system components), and that on the other hand the user can trust the navigation data which he receives by way of satellite navigation signals from the satellites of the GNSS; that is, he can rely on the precision of the received navigation data.

Known integrity concepts are that of Galileo, of the Wide Area Augmentation System (WAAS) and of the European Geostationary Navigation Overlay Service (EGNOS). In the case of the integrity concept of Galileo, in particular, observations are received only for judging the integrity of a satellite navigation signal when leaving the phase center of the satellite transmission antenna. All other error sources are covered with respect to the integrity by global models, which are necessarily very conservative in order to receive satellite navigation signals that are as reliable or have as much integrity as possible. However, specifically because of this conservative manner of the global models, the efficiency of the integrity system of a GNSS, such as Galileo, is significantly determined by the efficiency of these global models and, in particular, is restricted.

It is therefore an object of the present invention to provide an improved method and apparatus for monitoring the integrity of satellite navigation signals.

This and other objects and advantages are achieved by the method and apparatus for monitoring the integrity of satellite navigation signals, which uses a combination of different detection mechanisms for integrity problems to offer improved integrity services on the one hand, and to improve the efficiency of a GNSS, on the other hand. According to the invention, integrity problems which had already been detected by a detection mechanism, can be taken into account in computing the efficiency of a subsequently implemented detection mechanism for integrity problems of a lower probability. This makes it possible to reduce the demand on the subsequently implemented detection mechanism, and to maintain or improve the efficiency of a GNSS. As an alternative, the efficiency of the subsequently implemented detection mechanism may remain the same and may be offered with a higher-quality, particularly more precise integrity service, because of the combined detection mechanisms. On the whole, the invention permits a better integrity monitoring than can be achieved by means of the known integrity concepts described above.

According to an embodiment of the invention, a method is provided for monitoring the integrity of satellite navigation signals and detecting integrity problems, which has the following steps:

In a first detection of integrity problems the same entity of a navigation signal (that is, the same element or portion of the signal) is received from a certain satellite at different sites, and the received entities are evaluated to estimate and characterize the errors in the signal (and optionally the error in the error determination itself) in order to then finally use this information together with other information to determine the integrity risk.

In a second detection, one or more measurements of one or more received navigation signals from a certain satellite are made and evaluated in order to estimate and characterize the errors in the signals (and optionally the error in the case of the error determination). This information is then used, together with other information, to determine integrity risk. This step is carried out for all signals participating in the position solution.

In a third detection, several navigation signals from different satellites are measured, and the measurements are evaluated to determine the integrity risk. Integrity problems which are detectable during the first and second detection are taken into account only with the probability that they occur during the third detection, and had not been discovered during the first and second detection.

The first and the second detections do not necessarily have to follow one another but can also be carried out in reverse order, or a step can also be omitted completely.

According to an embodiment of the invention, the first detection of integrity problems can always be carried out when an entity of a navigation signal from a certain satellite is received by different observation stations of a satellite navigation system. In this case, it can be ensured that always the same navigation signal entity is processed by the first detection mechanism. A modeling of the error action, as required, for example, in the current Galileo concept (because at a point in time all signals to satellites are measured at an observation station in the case of Galileo so that different observation stations measure different signal entities), can thereby be eliminated in the case of this embodiment of the invention.

According to a further embodiment of the invention, the second detection can comprise a processing at the signal level of the at least one measurement in a receiver for satellite navigation signals. Particularly as a result of a skillful processing at the signal level of one or more signals of a certain satellite, errors can be efficiently detected by means of the second detection mechanism.

Another embodiment of the invention comprises an arrangement for monitoring the integrity of satellite navigation signals which comprises the following:

First detection devices for the first detection of integrity problems, the first detection devices being constructed to receive the same entity of a navigation signal from a certain satellite at different sites and to evaluate the received entities in order to provide information which finally can be used to determine the integrity risk;

second detection devices for the second detection of integrity problems, the second detection devices being constructed to carry out one or more measurements of one or more received navigation signals from a certain satellite and to evaluate the at least one measurement in order to provide information which can finally be used to determine the integrity risk; and third detection devices for the third detection of integrity problems, the third detection devices being constructed for carrying out measurements of several navigation signals of different satellites and for evaluating the measurements for determining the integrity risk. The third detection devices are also constructed such that integrity problems which can already be detected during the first and second detection are taken into account only with the probability that they occur during the third detection and had not been discovered during the first and second detection. By means of such an arrangement, integrity monitoring can be improved in the case of a satellite navigation system.

According to an embodiment of the invention, the first detection devices can be implemented in different observation stations for satellite navigation signals. For example, the observation stations of an earth-fixed receiving system for satellite navigation signals may comprise the first detection devices. In particular, the first detection devices can be implemented at least partially as a computer program.

Furthermore, according to an embodiment of the invention, each observation station may be constructed such that, when it receives the same entity of the navigation signal from the certain satellite, it evaluates the entity and transmits it to a processing center. As explained above, in this manner it can be ensured that always the same navigation signal entity is evaluated. The evaluation may also not take place before the processing center is reached. The processing center is provided particularly for the processing of signals of the individual observation stations, and for coordinated control of a satellite navigation system. For example, the processing center can be used to generate and distribute integrity warnings in the satellite navigation system.

According to another embodiment of the invention, the second detection devices can be implemented in a receiver for the satellite navigation signals, particularly a processing center for satellite navigation signals or, alternatively, in each user receiver.

Furthermore, according to an embodiment of the invention, the second detection devices can be constructed to carry out the evaluation of the at least one measurement of the received navigation signal from the certain satellite by processing at the signal level.

According to another embodiment of the invention, the third detection devices can be implemented in a receiver for the satellite navigation signals, particularly a processing center for satellite navigation signals or, alternatively, in the user receiver.

Other objects, advantages and novel features of the present invention will become apparent from the following detailed description of the invention when considered in conjunction with the accompanying drawings.

DETAILED DESCRIPTION OF THE DRAWINGS

In the following, identical and/or functionally identical elements may be provided with the same reference numbers.

Figure 1A:
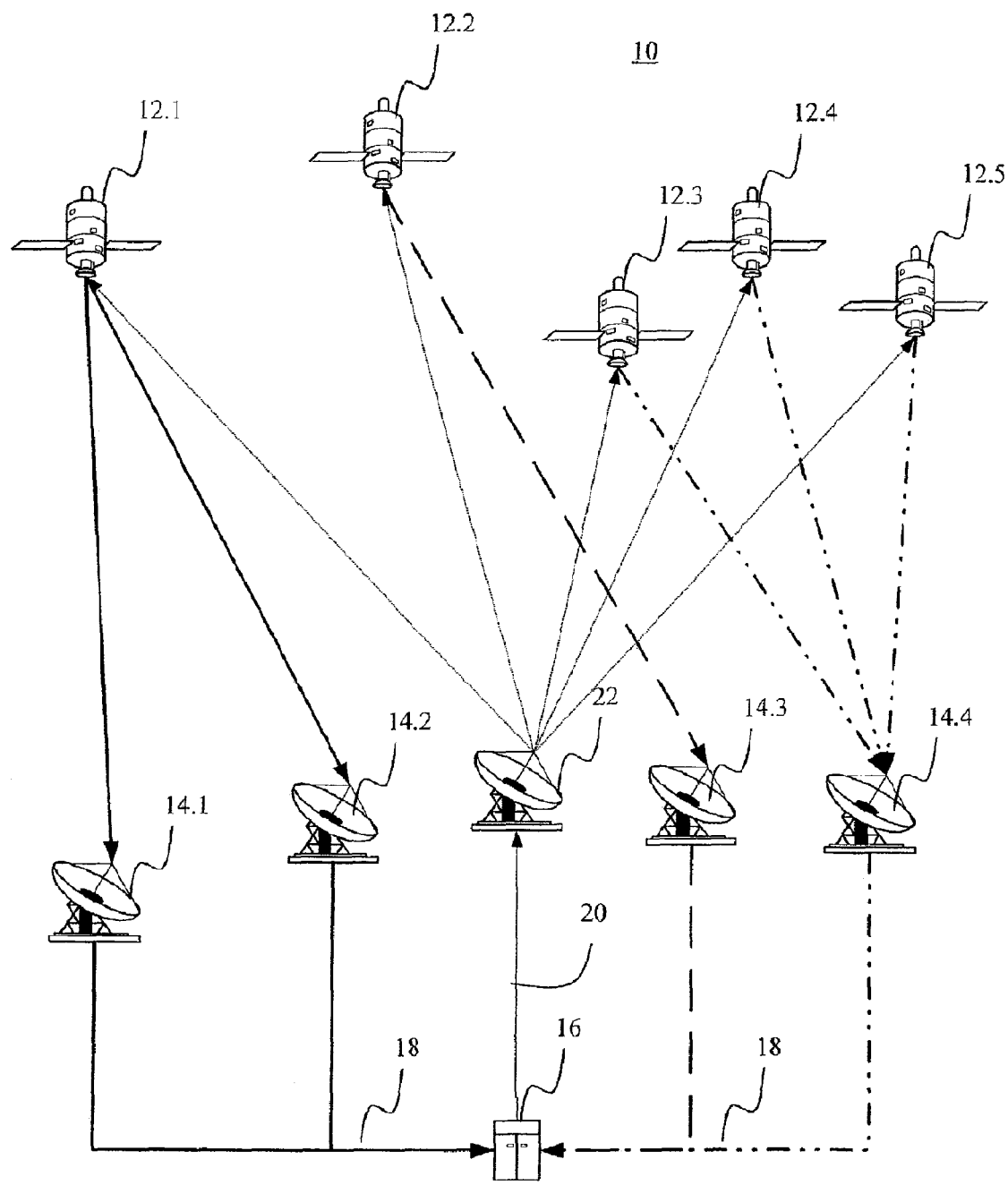
FIGS. 1A and 1B illustrate an arrangement for monitoring the integrity of satellite navigation signals according to an embodiment of the present invention.
Figure 1B:
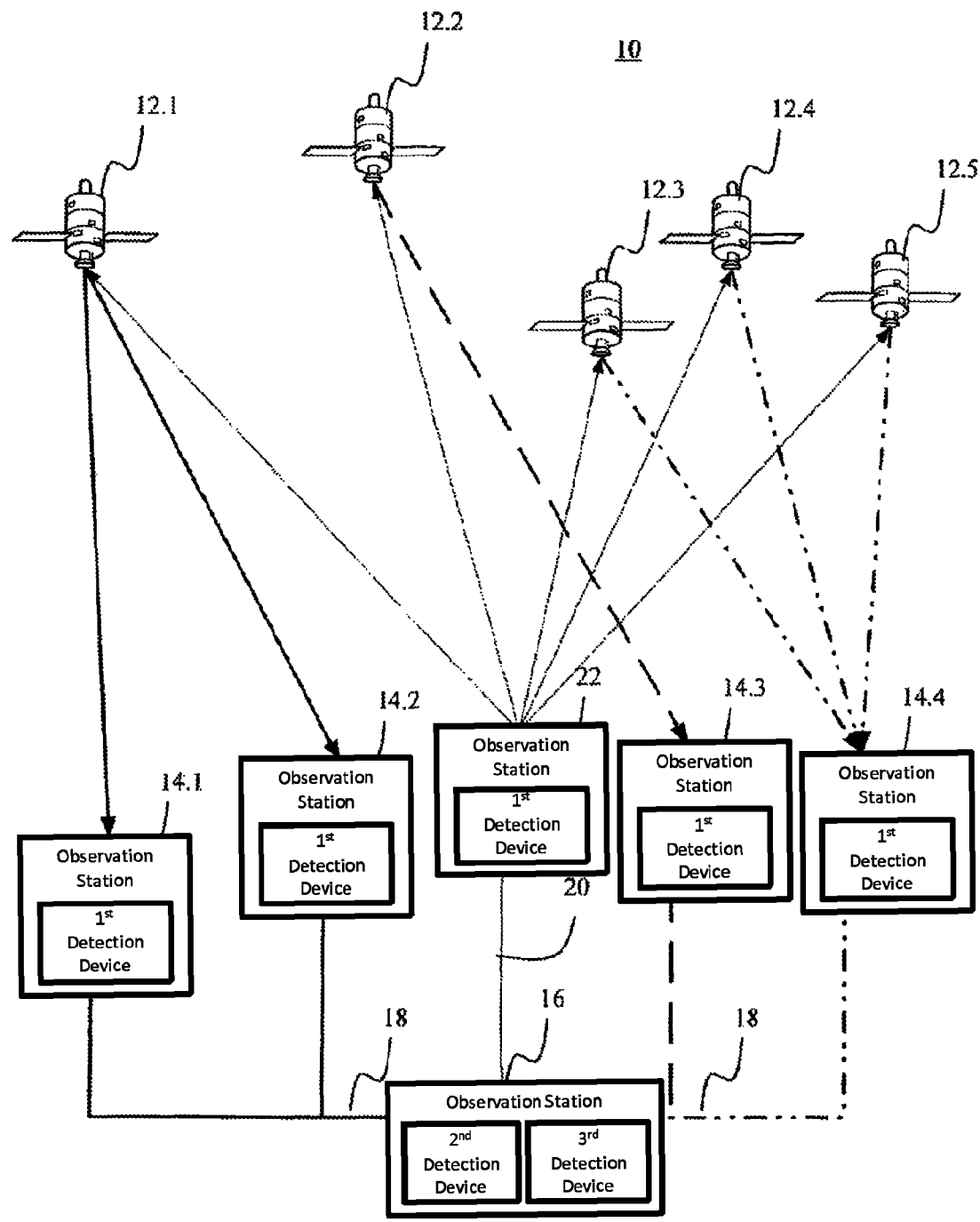

FIGS. 1A and 1B illustrate a satellite navigation system 10 having several satellites 12.1 to 12.5, and a network of observation stations 14.1 to 14.4, which can include first detection devices. The network of observation stations 14.1 to 14.4, together with a processing center 16 for observations of the observation stations 14.1 to 14.4, forms an earth-fixed receiving device for the satellite signals emitted by the satellites 12.1 to 12.5. The processing center 16 can include send and third detection devices. The latter signals contain parameters of the emitting satellite, such as the clock time of the highly precise satellite clock at the point in time of the emission of the signal, an unambiguous satellite identification, data concerning the orbit of the satellite, integrity warnings and additional information which is essential particularly for the position determination by the satellite navigation system 10.

The satellite navigation system 10 is designed, for example, for use by mobile navigation devices. It is known for such a use system to evaluate received satellite signals in order to determine its own position. If a signal of a certain satellite contains an integrity warning, the use system knows that this signal is not suitable for an exact position determination.

The integrity mechanism in a satellite system 10, such as Galileo, requires a corresponding ground infrastructure for the determination of faulty satellite signals. Integrity is monitored particularly by evaluating the satellite navigation signals received by the observation stations 14.1 to 14.4 in the processing center 16. In the event of faulty satellite navigation signals, the processing center 16 generates corresponding integrity warning signals 20 which are transmitted via a transmission antenna 22 to the satellites 12.1 to 12.5 (outlined by dotted thin arrows), for retransmission from the satellites 12.1 to 12.5 to use systems. According to the invention, reliable and efficient integrity monitoring in the satellite navigation system 10 is now ensured as follows:

The integrity problem of a satellite navigation system can be divided into three classes of integrity problems which can be detected by three different detection mechanisms 1 to 3:

1. A first class of integrity problems has the same cause for all users (i.e., use systems), such as mobile navigation devices. Such integrity problems can be best detected by observation and joint evaluation of one and the same entity of a satellite navigation signal from different sites. Typical examples of causes or triggers of such integrity problems are, for example, errors when generating a satellite navigation signal, clock errors in a satellite, and orbital and positional errors of a satellite.

In the figures, the detection of this first class of integrity problems by observation of the signals of an individual satellite 12.1 is shown by bold and continuous lines. For this purpose, the same signal entity from the satellite 12.1 is measured by two observation stations 14.1 and 14.2, and transmitted from the observation stations 14.1 and 14.2 to the processing center 16 for evaluation. In this case, it is essential that the same measured entity of a satellite navigation signal, which was received from the different observation stations 14.1 and 14.2 at various sites, is received and processed by the processing center 16. As a result, signal errors which have the same cause can be determined with a high probability: for example, the above-mentioned signal generating errors in the satellite, an inaccurate clock in the satellite, et cetera. In the processing center 16, integrity problems of this first class can be determined and taken into account during further processing, particularly during the generating of integrity warning signals. The first detection of integrity problems of the first class can take place exclusively in the processing center 16, or the detection can be divided between the observation station 14.1 or 14.2 and the processing center 16. Of course, also more than two observation stations may participate in this process.

2. A second class of integrity problems have different causes for different users. These problems can be detected by one or more measurements of one or more navigation signals of a single satellite. These problems occur, for example, because of ionospheric effects, multipath propagation, disturbances or sometimes even fraudulent effects on a satellite navigation signal. The detection of such errors can be achieved by skillful processing at the signal level of the individual signals of the individual satellites or by processing several signals from a single satellite in a receiver for satellite navigation signals.

In the figures, the detection of this second class of integrity problems by observing the signals of a single satellite 12.2 is outlined by bold and broken lines. For this purpose, the signals of a specific satellite 12.2 are measured from an observation station 14.3 which acts as the receiver. The measurements are transmitted to the processing center 16 which evaluates them at the signal level in order to detect signal errors, for example, because of disturbances on the transmission path from the satellite 12.2 to the observation station 14.3. Here also, the second detection of integrity problems of the second class can take place exclusively in the processing center 16. Alternatively, it can also be divided between the observation station 14.3 and the processing center 16, or carried out only in the user receiver. When the detection is carried out in the user receiver, no communication is required for the detection of problems of the second class, which simplifies the construction and operation of the system.

3. Finally, a third class of integrity problems may have different causes for different users but cannot be detected by measurements on signals to individual satellites. This class of integrity problems can be detected only by one or more measurements of the navigation signals of different satellites 12.3 to 12.5 and by the joint evaluation of these measurements. Such technologies are classically called RAIM (Receiver Autonomous Integrity Monitoring).

In the figures, the detection of this third class of integrity problems is commenced by an observation station's observing the signals shown by bold, dash-doted lines of different satellites 12.3 to 12.5. Further, the observation station 14.4 transmits the measurements to the processing center via the communication network 18 for evaluation. The third detection of integrity problems of the third class can again take place in the processing center 16, or it can be divided between the observation station 14.4 and the processing center 16.

The final evaluation of the detected integrity problems of different classes takes place in the user receiver, in which all different measurements and the information derived in the processing center 16 respectively concerning the integrity of the individual signals converge for the detection of integrity problems. For this purpose, all three detection mechanisms (that is, the detection mechanisms for the first to third class of integrity problems, corresponding to a first, second and third detection, are used in combination in the processing center 16 to detect integrity problems, as efficiently as possible. Optionally, the detection of problems of Classes 2 and 3 may also be carried out only in the user receiver. In this case, problems which can already be detected by one of the two first mechanisms, when the efficiency of the later mechanisms is computed, are taken into account only with the probability that they occur and have not been discovered by one of the preceding mechanisms. This reduces the demands on the later mechanism, or, while the efficiency of the last algorithm is the same, makes it possible to offer a higher-quality integrity service.

In the following, a few details will be explained concerning the different detection mechanisms.

In the first mechanism or first detection, observations at the different observation stations 14.1 and 14.2 are always carried out precisely when a particular entity of the signal arrives at the observation station 14.1 or 14.2. As a result, for each satellite, the same signal entity is measured at all observation stations, which makes it unnecessary to model the changing of error. Naturally, each observation station must now carry out the measurements to different satellites at different times, if possible.

The second mechanism or the second detection so far has not been used for the computation of the efficiency of the integrity system of a satellite navigation system, and therefore de facto it has also not been used for the integrity system. Measurements by different signal processing techniques permit the detection of many signal errors, and then the exclusion of such signals from further use. The question of how large the error must be so that the measurement on the individual signals can detect such errors, and how large the measuring precision is in the case of this process, is particularly significant here. These parameters should then naturally be taken into account for the individual error sources, with the corresponding probabilities when computing the integrity risk.

As mentioned above, the third mechanism and the third detection, in principle, are known as RAIM. According to the invention, this mechanism now detects only a very limited number of possible errors, because errors had already been detected by means of the first and second detection mechanism.

Summarizing, by means of the invention, integrity in a satellite navigation system can be monitored efficiently. In particular, the invention makes it possible to offer better integrity services in a satellite navigation system.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

REFERENCE NUMBERS

10 Satellite navigation system
12.1-12.5 Satellite
14.1-14.4 Observation station
16 Processing center
18 Communication Network
20 Integrity warning signal
22 Transmission antenna for integrity warning Signal

What is claimed is:

1. A method for monitoring the integrity of satellite navigation signals, said method comprising:
    a first detection of integrity problems, in which the same entity of a navigation signal from a specific satellite is received at different sites, and evaluated to estimate both the error in the entity and the error introduced by the error estimation;
    a second detection of integrity problems, in which at least one measurement of one or more received navigation signals from a specific satellite is carried out, and the at least one measurement is evaluated to estimate both the error in the entity and the error introduced by the error estimation;

subsequently, a third detection of integrity problems in which a plurality of navigation signals from different satellites are measured and jointly evaluated to estimate both the error in the entity and the error introduced by the error estimation;

wherein integrity problems of the satellite navigation signals are detected using results of the first, second and third detections in combination;

wherein the first and second detections detect different types of integrity problems and integrity problems which are detectable during the first and second detections are taken into account if they occur during the third detection and have not been discovered during the first and second detection.

2. The method according to claim 1, wherein the first detection of integrity problems is always carried out when an entity from a specific satellite is received by different observation stations of a satellite navigation system.

3. The method according to claim 1, wherein the second detection comprises processing at the signal level of the at least one measurement in a receiver for satellite navigation signals.

4. The method according to claim 1, wherein the integrity information not computed or estimated in the user receiver is transmitted by way of a suitable communication medium to the user receiver.

5. The method according to claim 1, wherein the processing center is implemented in each satellite or in a subset of the satellites.

6. The method according to claim 5, wherein:
the method is implemented in at least one geostationary satellite; and
the at least one geostationary satellite disseminates obtained information to all or to a subset of the satellites of the navigation system.

7. The method according to claim 5, wherein:
the method is implemented in at least one geostationary satellite; and
the at least one geostationary satellite disseminates the obtained information directly to users within a visibility range of the at least one geostationary satellite.

8. Apparatus for monitoring the integrity of satellite navigation signals, said apparatus comprising:
first detection devices for a first detection of integrity problems, said first detection devices being configured to receive the same entity of a navigation signal from a specific satellite at different sites, and to evaluate the received entities to estimate both the error in the entity and the error introduced by the error estimation;
second detection devices for a second detection of integrity problems, said second detection devices being configured to perform at least one measurement of at least one received navigation signal from a specific satellite, and to evaluate the at least one measurement to estimate both the error in the entity and the error introduced by the error estimation; and
third detection devices for a third detection of integrity problems, said third detection devices being configured to perform measurements of several navigation signals from different satellites, and to jointly evaluate the measurements to determine the integrity risk; wherein
the third detection devices are further configured so that integrity problems which are detectable during the first and second detections are taken into account only if they occur during the third detection, and have not been discovered during the first and second detection;
the first and second detection devices detect different types of integrity problems; and
integrity problems of the satellite navigation signals are detected using results of the first, second and third detections in combination.

9. The apparatus according to claim 8, wherein the first detection devices are implemented in different observation stations for satellite navigation signals.

10. The apparatus according to claim 9, wherein:
each observation station is configured such that, when the same entity of the navigation signal is received from the specific satellite, it evaluates the entity; and
the evaluation is transmitted to a processing center.

11. The apparatus according to claim 8, wherein the second detection devices are implemented in a receiver for the satellite navigation signals in a processing center for satellite navigation signals.

12. The apparatus according to claim 8, wherein the second detection devices are implemented in a receiver for the satellite navigation signals, in the user receiver.

13. The apparatus according to claim 8, wherein the second detection devices are further configured to evaluate the at least one measurement of the received navigation signal from the specific satellite, by processing at the signal level.

14. The apparatus according to claim 8, wherein third detection devices are implemented in a receiver for the satellite navigation signals, in a processing center for satellite navigation signals.

15. The apparatus according to claim 8, wherein the third detection devices are implemented in a receiver for the satellite navigation signals, in a processing center for satellite navigation signals.

16. The apparatus according to claim 8, wherein the third detection devices are implemented in a receiver for the satellite navigation signals, in the user receiver.

17. The apparatus according to claim 8, wherein the third detection devices are implemented in a receiver for the satellite navigation signals, in the user receiver.

* * * * *